United States Patent
Brunfeld et al.

(10) Patent No.: US 7,220,955 B2
(45) Date of Patent: May 22, 2007

(54) THREE-DIMENSIONAL IMAGING RESONATOR AND METHOD THEREFOR

(75) Inventors: Andrei Brunfeld, Cupertino, CA (US); Gregory Toker, Jerusalem (IL); Bryan Clark, Mountain View, CA (US)

(73) Assignee: Xyratex Technology Limited, Havant, Hampshire (GB)

( * ) Notice: Subject to any disclaimer, the term of this patent is extended or adjusted under 35 U.S.C. 154(b) by 21 days.

(21) Appl. No.: 11/169,517

(22) Filed: Jun. 29, 2005

(65) Prior Publication Data

US 2005/0279954 A1    Dec. 22, 2005

Related U.S. Application Data

(63) Continuation-in-part of application No. 10/644,243, filed on Aug. 20, 2003, now Pat. No. 7,022,978.

(60) Provisional application No. 60/583,874, filed on Jun. 29, 2004.

(51) Int. Cl.
*H01J 3/14* (2006.01)
*H01J 40/14* (2006.01)
*H01J 5/16* (2006.01)

(52) U.S. Cl. ............... 250/216; 359/237; 359/245; 359/260; 356/237.2

(58) Field of Classification Search ......... 250/201.5, 250/216, 234–236, 559.11, 559.22, 559.4, 250/559.45; 359/237–324, 5.05, 450, 237.2, 359/479, 502, 519

See application file for complete search history.

(56) References Cited

U.S. PATENT DOCUMENTS

| 5,235,192 | A  | 8/1993  | Chase et al.   |
| 6,522,471 | B2 | 2/2003  | Clark          |
| 6,653,649 | B2 | 11/2003 | Clark et al.   |
| 6,700,840 | B2 | 3/2004  | Clark          |
| 6,714,295 | B2 | 3/2004  | Clark et al.   |
| 6,717,707 | B2 | 4/2004  | Clark          |
| 6,778,307 | B2 | 8/2004  | Clark          |

(Continued)

OTHER PUBLICATIONS

U.S. Appl. No. 11/143,018, filed Jun. 1, 2005, Brunfeld, et al.

(Continued)

*Primary Examiner*—Georgia Epps
*Assistant Examiner*—Patrick J. Lee
(74) *Attorney, Agent, or Firm*—Mitch Harris, Atty at Law, LLC; Andrew M. Harris

(57) ABSTRACT

A three-dimensional imaging resonator and method therefor provides improved surface height measurement capability in optical measuring systems. A resonator including a surface of interest in a resonant image path is coupled to an external multi-pixel detector that detects an image of intensity of light reflected from or transmitted through the resonator. An imaging system is included in the resonator to image a region of a surface of interest on another reflector forming part of the resonator. By changing an effective cavity length of the resonator, the image is "scanned" in a direction perpendicular to the other reflector and a processing system stores information corresponding to resonance peaks to achieve a mapping of feature height above the surface of interest. The resonator effective cavity length can be changed by sweeping the illumination wavelength or by mechanically or otherwise altering the optical length of the resonator.

20 Claims, 5 Drawing Sheets

U.S. PATENT DOCUMENTS

| | | | |
|---|---|---|---|
| 6,879,421 B2 * | 4/2005 | Clark et al. | 359/237 |
| 6,927,864 B2 | 8/2005 | Clark et al. | |
| 7,022,978 B2 | 4/2006 | Clark et al. | |
| 7,102,740 B2 | 9/2006 | Clark et al. | |
| 2005/0073734 A1 * | 4/2005 | Verma et al. | 359/260 |

OTHER PUBLICATIONS

U.S. Appl. No. 11/149,094, filed Jun. 8, 2005, Toker, et al.
U.S. Appl. No. 11/167,807, filed Jun. 27, 2005, Brunfeld, et al.
U.S. Appl. No. 11/156,309, filed Jun. 17, 2005, Brunfeld, et al.
U.S. Appl. No. 10/770,866, filed Feb. 4, 2004, Brunfeld, et al.

* cited by examiner

THREE-DIMENSIONAL IMAGING RESONATOR AND METHOD THEREFOR

RELATED APPLICATIONS

This application is related to U.S. Provisional Patent Application "3D RESONANT IMAGING", Ser. No. 60/583,874, filed by the same inventors on Jun. 29, 2004, from which benefit under 35 U.S.C. §119(e) is claimed. The present application is also a Continuation-in-Part of U.S. patent application Ser. No. 10/644,243 entitled "METHOD AND APPARATUS INCLUDING IN-RESONATOR IMAGING LENS FOR IMPROVING RESOLUTION OF A RESONATOR-ENHANCED OPTICAL SYSTEM", which was filed on Aug. 20, 2003, and issued as U.S. Pat. No. 7,022,978 on Apr. 4, 2006, having at least one common inventor and assigned to the same assignee, the specification of which is incorporated by reference.

This application is also related to copending U.S. patent application Ser. No. 11,149,049 entitled "FABRY PEROT RESONATOR APPARATUS AND METHOD INCLUDING AN IN-RESONATOR POLARIZING ELEMENT", on Jun. 8, 2005 by the same inventors and assigned to the same Assignee, the specification of which is also incorporated herein by reference.

BACKGROUND OF THE INVENTION

1. Field of the Invention

This invention relates to optical systems, and more specifically, to an optical system that detects very fine three-dimensional surface features.

2. Description of the Related Art

The optical systems described in the above-incorporated U.S. patent application as well as other resonator-enhanced optical inspection systems, storage devices and other optical systems, such as those described by U.S. Pat. Nos. 6,700,840, 6,714,295, 6,717,707, 6,778,307 issued to Applicant Clark and others, the specifications of which are incorporated herein by reference, provide improved resolution, surface height detection and other performance improvements in traditional optical inspection systems and provide new types of optical systems that were not available prior to the inventions disclosed therein. Specifically, the incorporation of a Fabry-Perot resonator in the above-mentioned optical systems has increased the sensitivity of a particular measurement parameter via the resonance effects, and further made it possible to detect surface feature height using an intensity detector, whereas an external interferometer was previously required for the measurement.

Although each of the systems described in the above-referenced patents and in the above-incorporated parent application can measure the characteristics of a region, the measured characteristics are generally "lumped" in a single detector output and then the illumination and/or resonator is scanned across the surface of interest in order to determine the size and position of surface features.

In general, resonators are defined by a theoretically infinite number of reflections between multiple reflectors forming the resonant cavity. If a surface under measurement is one of the mirrors and exhibits surface variations, the resonance will cease to exist and the system becomes a multiple fringe interferometer. Multiple fringe interferometers can be used to provide topographic maps of a measured surface, but the resolution of the interferometer is limited by the number of reflections, which is dependent on surface variations as pointed out above. The resolution of the multiple fringe interferometer is also limited by the relatively small separation between the reflectors in order prevent loss of light energy due to angular variations.

Therefore, it would be desirable to provide further refinements in the optical systems described in the above-incorporated parent application and in other optical systems that can accurately measure the height and position of surface features while maintaining resonance independent of surface variations.

SUMMARY OF THE INVENTION

The foregoing objectives are achieved in an optical system and method for optical measurement. The measurement system includes an optical illumination system for illuminating a surface of interest forming part of a resonant cavity, one or more reflectors for forming the resonant cavity with the surface of interest and an optical imaging system within the resonant cavity for imaging a region on the surface of interest to another region on one of the one or more reflectors.

A multi-pixel camera external to the cavity receives a projection of the image, and the planes at which the resonance image resonates are scanned in a direction perpendicular to the one or more reflectors by changing the effective cavity length of the resonant cavity. A processing system is coupled to the camera for processing the image in conformity with the varying effective cavity length of the resonator to map the height of features of the surface of interest in conformity with the effective cavity length of the resonance cavity as the resonant plane intersects the "tops" of the features.

The resonant cavity effective cavity length can be changed by sweeping the wavelength of the illumination beam or by adjusting the physical or optical length of the cavity by mechanical, electromechanical, electro-optical or other means.

The system may include an illumination coupler for illuminating the above mentioned "measurement" image and additionally a reference beam from an output of the optical illumination source, a reference resonator for receiving the reference beam, an intensity detector optically coupled to the reference resonator, and a time-domain measurement system coupled to the intensity detector and the processing system for comparing a detected optical signals received from the intensity detector with data from the multi-pixel camera, providing a reference for knowing the exact wavelength at any instant in time.

The foregoing and other objects, features, and advantages of the invention will be apparent from the following, more particular, description of the preferred embodiment of the invention, as illustrated in the accompanying drawings.

DESCRIPTION OF EMBODIMENTS OF THE INVENTION

The present invention provides an improved method and system for determining topographic information about a surface of interest. The above-incorporated U.S. patent applications and U.S. patents disclose various systems and methodologies, some of which are capable of determining the height of surface features extending above or below a nominal level of a surface of interest. However, the systems described the above-referenced patents and patent applications generally detect the height and other characteristics of the surface at a single point. A scanner is then used to translate the measuring system with respect to the surface of interest so that topographic and other measurement information is obtained.

Cameras and line detectors such as charge-coupled device (CCD) and complementary metal-oxide semiconductor (CMOS) cameras and line detectors have become plentiful and relatively inexpensive in the last decade and also have increased in resolution. An optical inspection system equipped with a camera can measure an entire image with a specified resolution, not only a point. Therefore, cameras can provide information without mechanically scanning over a surface and in applications where scanning is impractical.

However, in resonator-based optical systems, information is generally gathered at or near the resonance peaks, which dictates that an inspected image or spot on the surface of interest be essentially planar. The above-incorporated parent application discloses a system for visual observation that can include a camera for data gathering and can be used to observe whether points within a surface image (spot) fall out of resonance, e.g., to detect pits or bumps in a surface.

The present invention provides true three-dimensional (3D) mapping capability through tuning of the effective cavity length of a resonator including the surface of interest. By tuning the effective cavity length, the resonant plane in the path of the image is scanned or moved so that detailed height information can be gathered by detecting the sequential positions of the resonance peak fringes as the cavity length is changed. The peaks can be individually detected for each pixel or group of pixels so that a topographic map of a surface can be generated without mechanically scanning over the surface.

Figure 1:
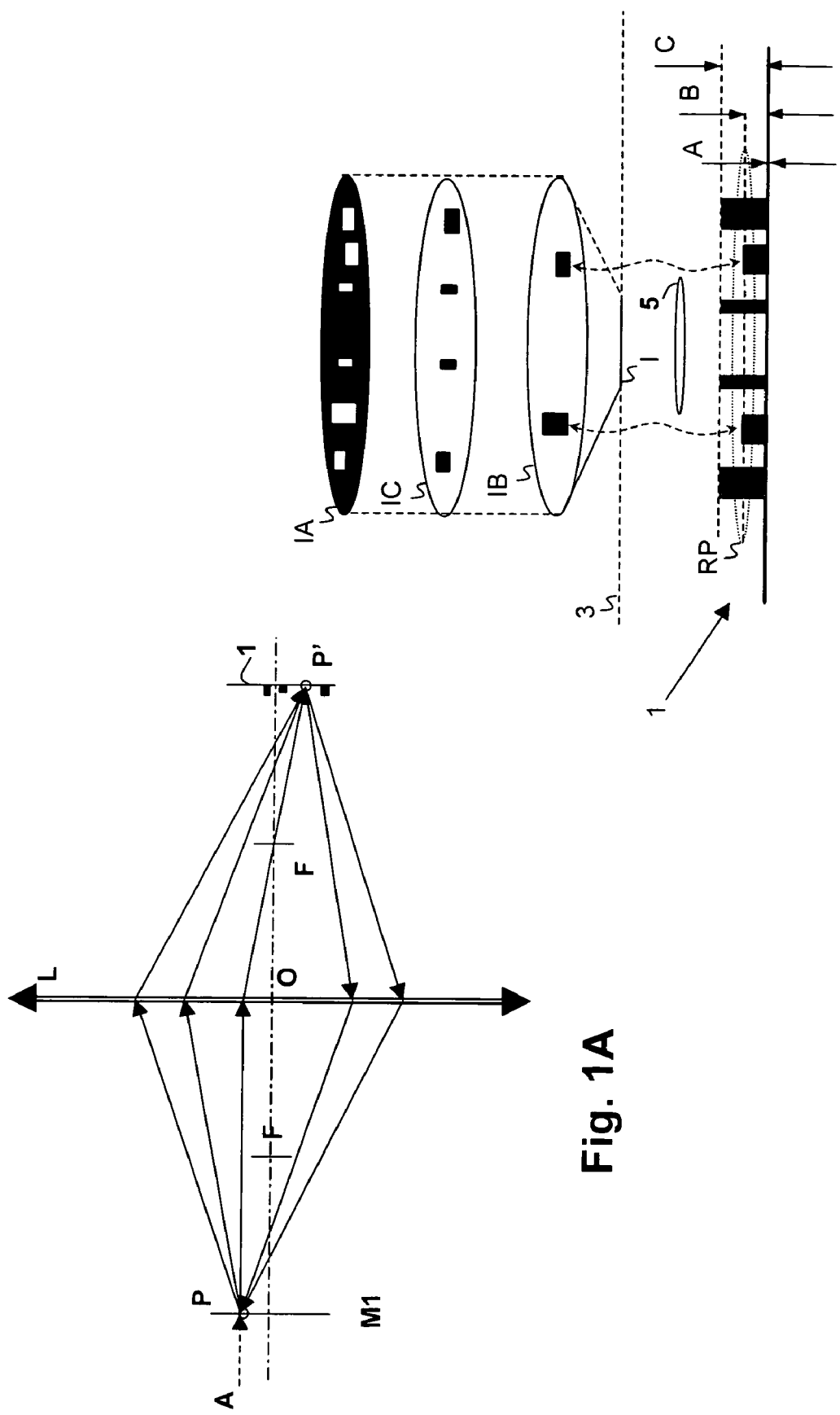
FIGS. 1A and 1B are pictorial diagrams depicting operation of an optical system in accordance with an embodiment of the present invention.

Referring now to the Figures, and in particular to FIG. 1A, operation of a system in accordance with an embodiment of the present invention is depicted in the form of an optical schematic. Resonance is supported between mirror M1 and a surface of interest 1. Mirrors M1 is generally partially reflective, to allow coupling to the exterior of the cavity formed between mirror M1 and surface of interest 1. A lens L images mirrors M1 onto surface of interest 1 and vice-versa (for exemplary purposes, a 1:1 magnification is illustrated). Any ray A illuminating mirror M1 at a point P provides a partially transmitted ray that is collected by lens L and imaged from point P of mirror M1 at point P' of surface of interest 1. Beams reflected from point P' return through lens L to mirror M1 and are imaged at location P. The reflections are supported over an angular space that reaches to the angle (in actuality forming a cone) where a larger angle ray will not be collected by lens L. Other rays introduced at points other than P and/or P' will establish a resonance between two corresponding points on the mirror M1 and surface of interest 1 within the field of view of lens L. Mirror M1 and surface of interest 1 form a resonant optical cavity that is also an imaging system.

Each object/image point pair within a field of view of lens L resonates independently from all other points within the limitations of the resolution of lens L. Lens L thus produces a "resonant image" between the two mirrors. Illumination can be spatially coherent or provided from a finite source. The resonant image described above can be coupled outside of the cavity through either (or both) of mirror M1 and surface of interest 1 and projected or imaged by known techniques onto a detector, camera, eyepiece, or other vision system. Amplitude and phase at the surface of interest 1 is accurately reproduced at mirror M1 due to the resonance effect. The amplitude and phase matching greatly increases spatial as well as height resolution distribution of the field at surface of interest 1 that is reproduced at the image mirror M1.

Referring now to FIG. 1B, operation of a system in accordance with an embodiment of the present invention is further depicted. An image I of a surface of interest 1 provided from a resonator formed between a partially reflective surface 3 and surface of interest 1 is maintained in resonance independent of surface variations of surface of interest 1 by a lens 5, that serves as an imaging system to image a region of surface of interest onto image I at partially reflective surface 3 and vice-versa. For illustrative purposes, image I is scanned through three resonant heights IA–IC by changing the effective cavity length of a resonator that includes surface of interest 1 as one of the reflectors. Features of various heights (A, B, C) are shown on surface of interest 1 to illustrate operation of the present invention. A parallel-plate Fabry-Perot resonator that is formed between two planar highly reflective surfaces will resonate at round-trip resonator lengths that are equal to multiples of a wavelength. A resonance plane RP is illustrated at height B and can be moved by changing the effective cavity length of the resonator. Assuming for illustration that the illustrated heights B, C are smaller than a half-wavelength, then resonance will be supported at only one height A, B or C at a time, and the particular height depends on the effective cavity length of the resonator. Even if heights B, C are greater than a half-wavelength, phase ambiguities in such a system are resolvable by techniques that are quite well known.

Therefore, by tuning the effective cavity length of the resonator through a range or various steps, various features will resonate and by detecting either the bright or dark peaks associated with the resonance (bright for transmission resonance, dark for reflection resonance) and logging them along with the cavity length, a three dimensional map of surface of interest 1 can be obtained. To illustrate, three image views IA, IB and IC, taken with reflection (dark) resonance for resonance at each of the three corresponding heights A, B and C are shown. In image IA, most of the image is illustrated as dark, representing resonance at surface level A with a few surface features falling out of resonance. When the effective cavity length is changed so that resonance occurs at height B, corresponding features having height B darken. Similarly in image IC, features having a height C are dark, while the remainder of the image is light. For transmission resonance, each of the image intensities are inverted, with features in resonance revealed by a bright detector (pixel) intensity level.

Figure 2:
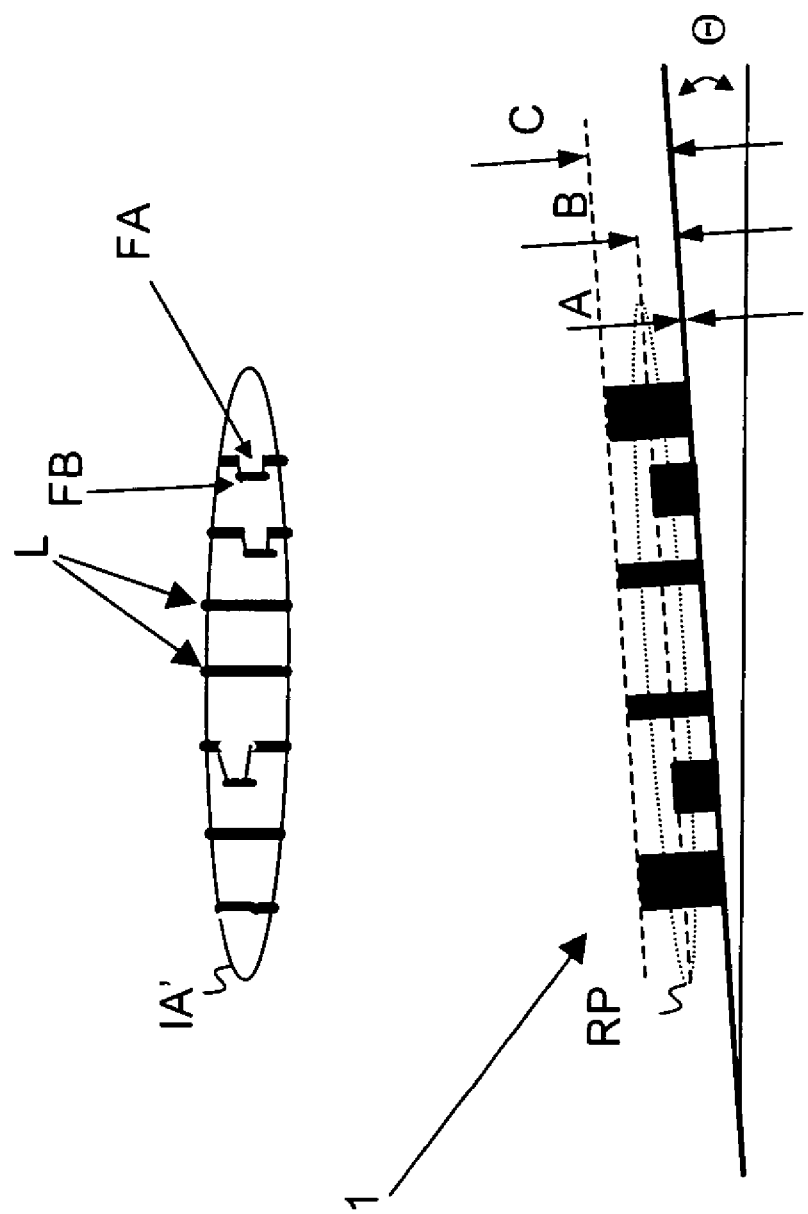
FIG. 2 is a pictorial diagram depicting operation of an optical system in accordance with another embodiment of the present invention.

While the above illustration provides a method by which a surface can be topgraphically mapped, there is no point of reference other than feature planes in resonance, such as image IA, which reveals the effective cavity length at which the nominal surface height A is in resonance. However, when surface of interest 1 is tilted at angle Θ as depicted in FIG. 2, self-referencing information is produced by lines L (interference fringes of the resonator) that repeat at distance $$D = \frac{\lambda}{2\tan\Theta}$$

whereλ is the wavelength of the illumination and Θ is the inclination angle. The width of lines L is $$d = \frac{\lambda}{2F\tan\Theta}$$

where F is the finesse of the cavity. Since the finesse can be relatively large, the fringes can be made very narrow. Finesse values between 10 and 50 are easily obtainable and depend only on the reflectivity of surface of interest 1 and the other reflector(s) forming the resonant cavity of the resonator.

Since there is no benefit in having lines L narrower than the camera pixel size and some disadvantage in that lines L could otherwise disappear (between pixels) for some values of effective cavity length, the width of lines L generally determines the resolution of the system. For a given camera resolution, the maximum tilt angle can therefore be determined from the formulas above, so that line widths of a few pixels are chosen. Surface features cause displacements in lines L, e.g. feature image FA, and additional feature images FB not located on a line L. In essence, lines L are contour lines of constant cavity length. Variations in the pattern of image IA' are observed as the effective cavity length of the resonator is changed and a perfectly smooth surface will show only straight lines L which will change in position as the effective cavity length is changed. For a total cavity round-trip change of one wavelength, a fringe will have moved to replace the next fringe in sequence. When surface of interest 1 is very smooth it is advantageous to introduce an intentional tilt Θ in order to be able to observe parallel lines L.

Figure 3:
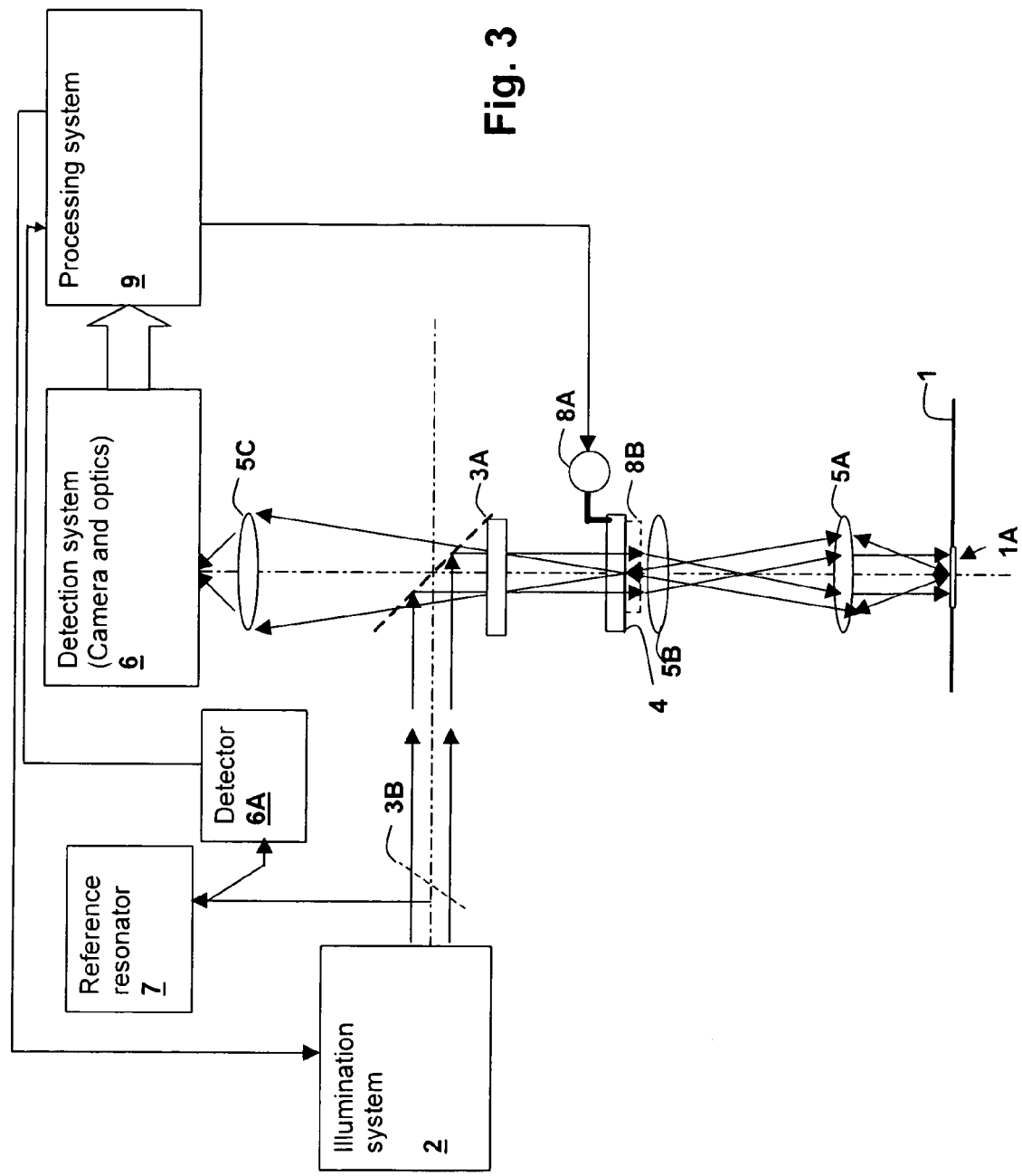
FIG. 3 is an illustration depicting an optical system in accordance with an embodiment of the present invention.

Referring now to FIG. 3, a system in accordance with an embodiment of the present invention is depicted. An illumination system 2, generally a laser, provides an illumination source that illuminates a measurement resonator formed between surface of interest 1 and a partially reflective surface 4. Illumination is coupled through a beamsplitter/ quarter-wave plate isolator subassembly 3A and light is coupled back out from the resonator through isolator subassembly 3A to a detection system 6 via a lens 5C that provides an image of a region 1A of surface of interest 1 across a two-dimensional multi-pixel array within detection system 6. Between partially reflective surface 4 and surface of interest 1 an imaging system is used to image region 1A onto a corresponding region of partially reflective surface 4 (and thereby to a corresponding region within detection system 6). Lens 5B is a field lens that and lens 5A is an imaging lens that work in concert to image region 1A onto partially reflective surface 4.

Detection system 6, which is generally a camera, provides an image of region 1A to processing system 9, which also controls the effective cavity length of the measurement resonator by changing the wavelength of illumination system 2 or altering the optical distance between partially reflective surface 4 and surface of interest 1. A mechanical positioner 8A such as a piezoelectric element or voicecoil assembly can physically move partially reflective surface 4 or an electrically tunable refractive media 8B such as a liquid crystal can be provided within the resonant cavity and tuned in response to signals from processing system 9. A coupler 3B couples a reference beam from illumination system 2 to a reference resonator 7 from which a light output is detected by a detector 6A and used by processing system 9 to normalize the effective cavity length of the measurement resonator as the effective cavity length is swept or changed (stepped).

Processing system 9 takes the image output of detection system 6 and the output of reference resonator 7 and maps either dark or bright resonance values against the effective cavity length to obtain a topographic profile of the surface as the resonance plane is scanned through the range. Phase unwrapping techniques are used to remove ambiguities in feature height and/or the fringe displacement across surface of interest 1. Background (non-resonant) image information can also be used to provide an ordinary two-dimensional image of the surface (essentially a non-resonant camera image).

Figure 4:
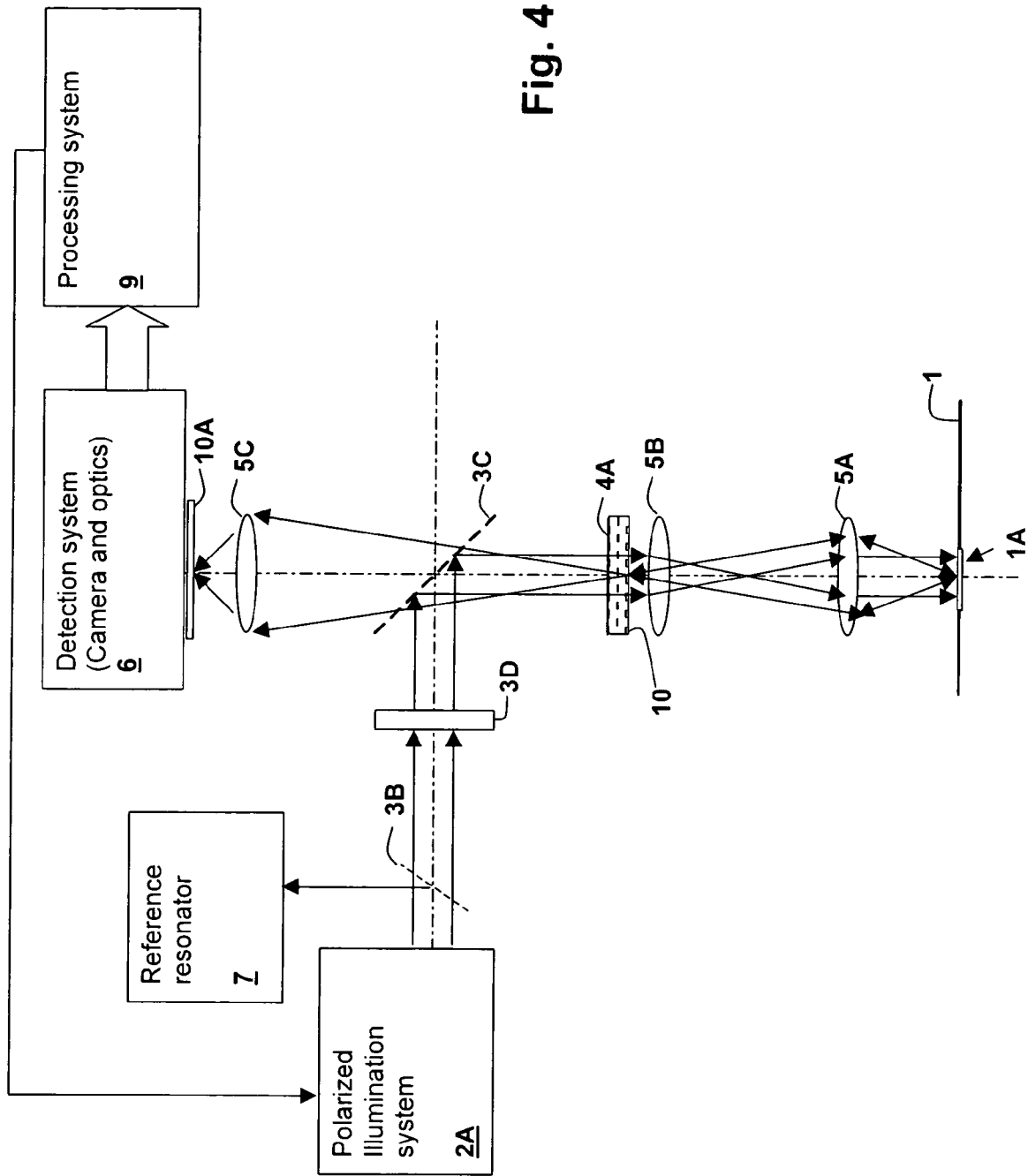
FIG. 4 is an illustration depicting another optical system in accordance with an embodiment of the present invention.

Referring now to FIG. 4, an optical system in accordance with another embodiment of the present invention is depicted. The system shown in the figure is similar to that of FIG. 3, so only differences will be described below. The system of FIG. 4 includes a polarizing element 10 within the resonant cavity, which may be a quarter-wave plate or other element capable of providing an orthogonal polarization change in two passes through polarizing element 10. Resonator systems with in-resonator polarizing elements are described in the above-incorporated co-pending Patent Application "FABRY-PEROT RESONATOR APPARATUS AND METHOD INCLUDING AN IN-RESONATOR POLARIZING ELEMENT", and therefore the theory will not be repeated herein other than to note that the system will have twice the sensitivity to height changes as the non-polarizer system of FIG. 3 and that dark field (bright lines) can be observed as an alternative to or in combination with the dark line reflection resonance image.

Isolator 3A of FIG. 3 is replaced in this application with a simple polarizing beam splitter 3C and a polarization rotation element 3D (e.g., a half-wave plate) is inserted in the illumination path. Rotation element 3D is included to allow an optional change in the illumination polarization, and therefore a change in the detection polarization. A changeable polarization is provided in order to examine surface of interest 1 under various polarization conditions. Other combinations of polarizing elements in the imaging and detection paths can also be used, as long as polarizing element 10 is included witin the resonator.

Although all of the alternative cavity tuning features of FIG. 3 are not shown in FIG. 4, it should be understood that any of the above-described techniques for varying the effective cavity length of the resonator can be employed with the polarizer, as well, as long as polarization within the resonator is nor further affected by the tuning.

Figure 5:
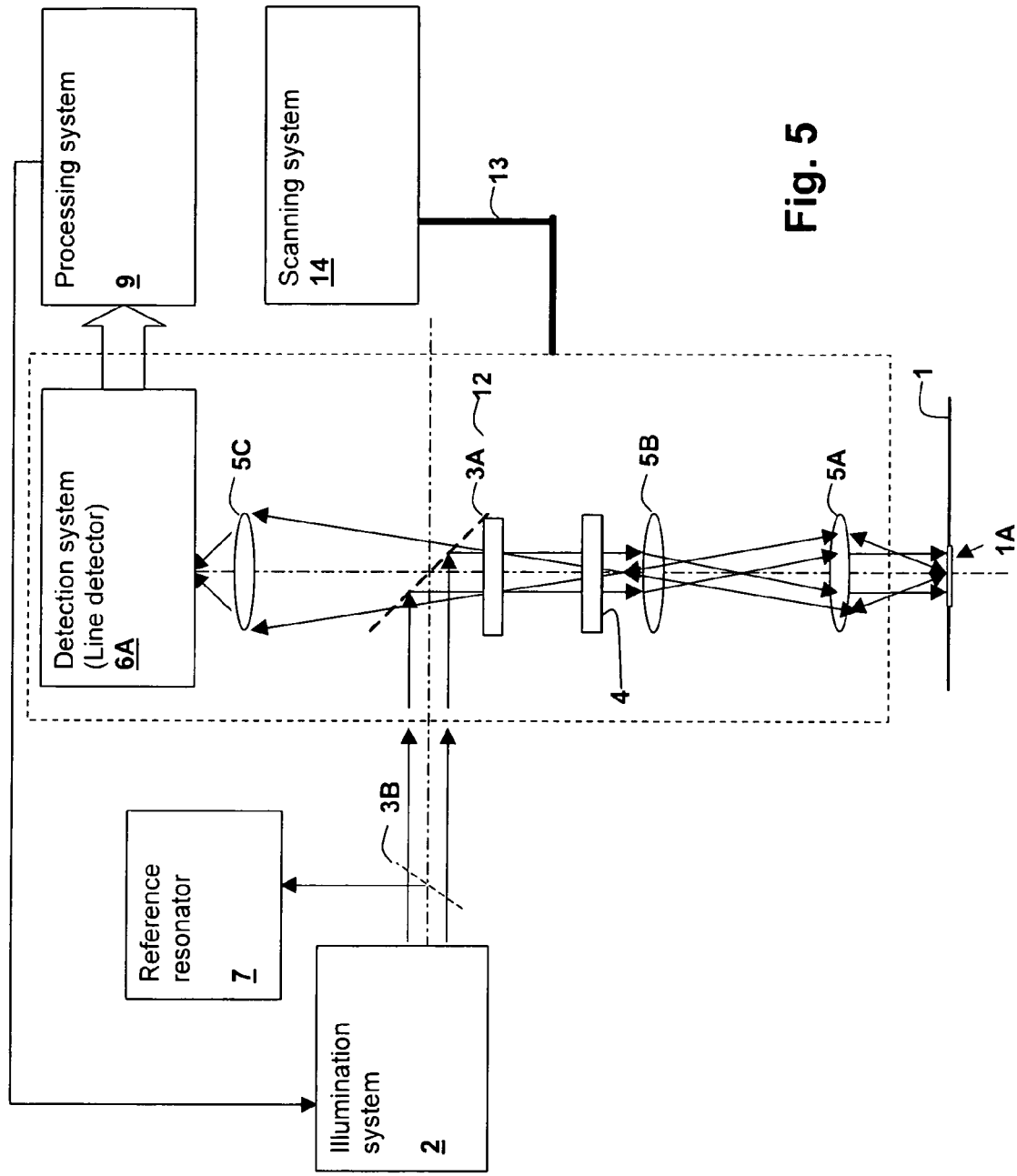
FIG. 5 is an illustration depicting still another optical system in accordance with an embodiment of the present invention.

Referring now to FIG. 5, an optical system in accordance with another embodiment of the present invention is depicted. The system shown in the figure is similar to that of FIG. 3, so only differences will be described below. The system of FIG. 5 includes a line detector instead of a camera within a detection subsystem 6A. As such, the image information is only available on a line and mechanical (or optical)

scanning of surface of interest with respect to the partially reflective surface 4 is provided by a scanning system 14 that generally provides translation between an optical head 12 and surface of interest 1 via a mechanical linkage 13. The system of FIG. 5 thus requires additional work by processing system 9 to control the positioning of head 12 and to relate the resonance data detected to the physical position of the optics with respect to the surface of interest.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. An optical system, comprising:
   an illumination system for providing an illumination beam for illuminating a surface of interest through a first partially reflective surface;
   at least one reflector including said first partially reflective surface for sustaining multiple internal reflections of an image of a region on said surface of interest in a resonant cavity formed at least partially between said at least one reflector and said region of said surface of interest, and wherein an extraction partially-reflective one of said at least one reflector permits said image to exit said resonant cavity;
   at least one imaging device disposed within said resonant cavity to form an image of said region of said surface of interest on another region of said at least one reflector; and
   a multi-pixel detector for detecting an intensity profile of said image leaving said cavity through said extraction reflector.

2. The optical system of claim 1, further comprising a processing system having an input coupled to said multi-pixel detector for mapping peaks in said intensity profile corresponding to resonance between features of the surface of interest and the at least one reflector in conformity with an effective cavity length of the resonant cavity to determine topographic features of said surface of interest as said effective cavity length is varied through a range of effective cavity length.

3. The optical system of claim 2, wherein said at least one imaging device comprise:
   an imaging lens positioned at a predetermined position along an optical path between said at least one reflector and said surface of interest and having a predetermined focal length such that said region on said surface of interest is imaged onto a second region on said at least one reflector; and
   a focusing lens positioned between said imaging lens and said at least one reflector for focusing an image of points within said second region of said at least one reflector on corresponding unique points within said region of said surface of interest.

4. The optical system of claim 1, wherein said multi-pixel detector comprises a two dimensional camera.

5. The optical system of claim 1, wherein said multi-pixel detector comprises a line detector.

6. The optical system of claim 5, further comprising a scanning subsystem for translating said surface of interest with respect to said at least one reflector in a direction parallel to a primary plane of said at least one reflector, said translation performed to move said image in a direction perpendicular to a resolution direction of said line detector, and wherein said processing system further relates a position of said translating to said peaks in said intensity profile to yield a map of topographic variation in said direction of translation.

7. The optical system of claim 1, wherein said illumination system has a variable wavelength, and wherein said processor relates said varying wavelength with resonance peak data detected by examining values of pixel data read from said multi-pixel detector to determine a height at which said resonance peak data shows that resonance was supported above said surface of interest.

8. The optical system of claim 7, wherein said optical illumination system has a swept wavelength, and wherein said processing system detects said resonance peaks and stores timing information associated with said resonance peaks, whereby illumination wavelengths corresponding to said resonance peaks is logged, and wherein said processing system determines said height from said timing information.

9. The optical system of claim 1, wherein said resonant cavity has a tunable cavity length, and wherein said processor relates said tunable cavity length with resonance peak data detected by examining values of pixel data read from said multi-pixel detector to determine a height at which said resonance peak data shows that resonance was supported above said surface of interest.

10. The optical system of claim 1, further comprising:
    an optical coupler for receiving an output of said illumination system, and wherein said resonator is a measurement resonator coupled to a first output of said optical coupler;
    a reference resonator coupled to a second output of said optical coupler for generating at least a second resonance within a path of said reference beam; and
    a reference detector coupled to said reference resonator for measuring a reference intensity of light at said at least one reference resonator, and wherein said processing system is further coupled to an output of said reference detector, and compensates for deviations from an expected cavity length of said measurement resonator in conformity with an output of said reference detector.

11. The optical system of claim 1, further comprising a polarizing element located within a beam of said image within said resonator, wherein said polarizing element alters a polarization of light between a forward path and a reverse path of said beam within said resonant cavity, such that light traveling along said forward path prior to entering said polarizing element is orthogonal to light leaving said polarizing element along said reverse path.

12. The optical system of claim 1, wherein said surface of interest is tilted at a predetermined angle with respect to said at least one reflector, and wherein said processing system uses said predetermined tilt to relate a position of a resonance reference line in said intensity profile to a resonant distance above said surface of interest, whereby resonant peaks are present in said intensity profile at any effective cavity length of said resonator.

13. The optical system of claim 1, wherein the processing system combines data exclusive of said resonance peaks to form a conventional image of said surface of interest in a principle plane of said surface of interest.

14. The optical system of claim 13, wherein the processing system combines the conventional image for each of a number of discrete effective cavity length values with the topographic information obtained from the resonance peak variations to yield a full three-dimensional mapping of said surface of interest.

15. A method of optically observing heights of features above a surface of interest, comprising:

repeatedly reflecting incident light in a cavity formed at least partially between at least one reflector including at least one partially reflective surface and a surface of interest, wherein said repeatedly reflecting reflects between a first image region on said surface of interest and a second image region on said at least one reflector;

imaging said repeatedly reflecting light between a region of said surface of interest and another region of said at least one partially reflective surface;

detecting an intensity profile of light transmitted from said cavity through said at least one partially reflective surface; and changing an effective optical length of said cavity through a range of said effective optical length, whereby a changing plane of resonance reveals said heights of features as peaks in said intensity profile as said effective optical length of said cavity is changed.

16. The method of claim 15, further comprising determining topographic information about said surface of interest by observing peak variations in said intensity profile as said effective optical length of said cavity is changed.

17. The method of claim 15, wherein said changing changes a wavelength of said incident light.

18. The method of claim 15, wherein said changing changes an optical length of said cavity.

19. The method of claim 15, further comprising:

tilting said surface of interest at a predetermined angle with respect to said at least one reflector; and detecting a line in said intensity profile corresponding to a resonant topographic distance above said surface of interest, whereby said resonance line is detected at each effective cavity length of said resonator and used as a reference in said determining said topographic information.

20. An optical system, comprising:

an illumination system for providing an illumination beam for illuminating an image on a surface of interest through a first partially reflective surface;

at least one reflector including said first partially reflective surface for sustaining multiple internal reflections in a resonant cavity formed at least partially between said at least one reflector and said surface of interest, and wherein an extraction partially reflective one of said at least one reflector permits light to exit said resonant cavity forming an image of a region of said surface of interest;

at least one imaging device disposed within said resonant cavity to form said image of said surface of interest on said extraction partially reflective surface;

means for altering an effective cavity length of said resonant cavity whereby resonance is supported in said image at a variable resonant plane height above said surface of interest; and means for relating a resonance profile of said image as said resonant plane height is varied to said effective cavity length of said resonant, whereby topographic information about said surface of interest is obtained.

* * * * *